United States Patent [19]
Mrozik

[11] 3,859,443
[45] Jan. 7, 1975

[54] COMPOSITION AND METHODS OF TREATMENT EMPLOYING ACRYLANILIDES AS ANTICOCCIDIAL AGENTS

[75] Inventor: Helmut H. Mrozik, Matawan, N.J.

[73] Assignee: Merck & Co., Inc., Rahway, N.J.

[22] Filed: Nov. 15, 1973

[21] Appl. No.: 416,129

[52] U.S. Cl. .............................. 424/324, 260/558 R
[51] Int. Cl. ............................................. A61k 27/00
[58] Field of Search ..................................... 424/324

[56] References Cited
UNITED STATES PATENTS
3,689,556   9/1972   Welch et al ......................... 424/324

OTHER PUBLICATIONS
Chemical Abstracts, Vol. 43, (1949), p. 7192g.

*Primary Examiner*—Vincent D. Turner
*Attorney, Agent, or Firm*—Edmunde D. Riedl; Francis H. Deef; J. Jerome Behan

[57] ABSTRACT

The use of 3-(benzoyl)-2',6'-diloweralkylacrylanilides of the formula:

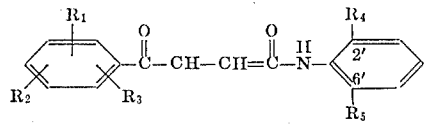

where $R_1$, $R_2$ and $R_3$ are the same or different and are hydrogen or loweralkyl; and $R_4$ and $R_5$ are the same or different and are loweralkyl as anticoccidial agents is disclosed, as well as anticoccidial compositions incorporating such compounds.

9 Claims, No Drawings

COMPOSITION AND METHODS OF TREATMENT EMPLOYING ACRYLANILIDES AS ANTICOCCIDIAL AGENTS

DISCLOSURE OF THE INVENTION

This invention relates to methods for the prevention and treatment of coccidiosis. More particularly, it relates to such methods employing the compounds, 3-(benzoyl) and loweralkyl substituted 3-benzoyl-2',6'-diloweralkylacrylanilides. Further, this invention relates to compositions incorporating such compounds which are useful for preventing and treating coccidiosis.

Coccidiosis is a common and widespread poultry disease caused by a number of species of protozoan parasites of the genus Eimeria, including *E. tenella, E. necatrix, E. acervulina, E. maxima, E. hagani,* and *E. brunetti. E. tenella* is the causative agent of a severe and often fatal infection of the caeca of chickens, which is manifested by severe and extensive hemorrhage, accumulation of blood in the caeca, and the passage of blood in the droppings. *E. necatrix* attacks the small intestine of the chick causing what is known as intestinal coccidiosis. Related species of coccidia such as *E. meleagridis* and *E. adenoides* are causative organisms of coccidiosis in turkeys. When left untreated, the severe forms of coccidiosis lead to poor weight gain, reduced feed efficiency and high mortality in fowl. The elimination or control of this disease is important in order to insure protecting a valuable source of food protein.

Therefore, one object of this invention is to provide methods for treating and preventing coccidiosis. Another object of this invention is to provide coccidiostatic compositions containing these benzoylacrylanilides as an active ingredient, especially active against the species *E. tenella*. Further objects will become apparent upon further reading of this description.

The compounds employed in this invention have the formula:

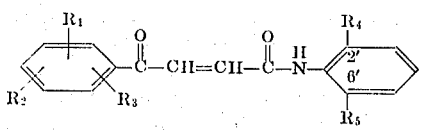

(Formula I)

In the above formula, $R_1$, $R_2$ and $R_3$ are the same or different and are hydrogen or loweralkyl, and $R_4$ and $R_5$ are the same or different and are loweralkyl. As used in this specification, the prefix "lower" is meant to include groups having from 1 to 4 carbon atoms, e.g. methyl, ethyl, propyl, and butyl, including the various isomers of propyl and butyl. Such compounds are the invention of my colleague, Nathaniel Grier.

Representative of such compounds useful in the treatment of coccidiosis include:
3-(Benzoyl)-2',6'-diisopropylacrylanilide,
3-(Benzoyl)-2',6'-dimethylacrylanilide,
3-(Benzoyl)-2',6'-diethylacrylanilide,
3-(3-Toluyl)-2',6'-dimethylacrylanilide,
3-(4-Toluyl)-2',6'-dimethylacrylanilide,
3-(4-Isopropylbenzoyl)-2',6'-dimethylacrylanilide,
3-(2,4,6-triisopropylbenzoyl)-2',6'-dimethylacrylanilide,
3-(3,4-Xyloyl)-2',6'-diethylacrylanilide,
3-(3,5-Xyloyl)-2'-methyl-6'-ethylacrylanilide,
3-(3,5-Di-t-butylbenzoyl)-2',6'-dimethylacrylanilide,
3-(3,4,6-Mesitoyl)-2',6'-dimethylacrylanilide, and the like.

As described more fully below, these anticoccidial compounds are prepared by the reaction of the appropriately substituted benzoylacrylic acid,

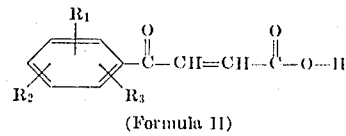

(Formula II)

where $R_1$, $R_2$ and $R_3$ are as previously defined, with an appropriate aniline derivative in the presence of a coupling reagent such as dicyclohexylcarbodiimide, phosphorous oxychloride/triethylamine complex, and the like.

As heretofore stated, it has now been found that the benzoylacrylanilides herein disclosed are highly active against protozoa responsible for coccidiosis, and hence are particularly useful in treating and preventing coccidiosis when administered to poultry. The active compounds are conveniently fed to poultry as a component of the feed of the animals although it may also be given dissolved or suspended in the drinking water. Although these compounds are effective against the many species of Eimeria, they are especially effective against *E. tenella*.

According to a preferred aspect of this invention, novel compositions for the treatment of coccidiosis are provided which comprises one or more substituted benzoylacrylanilides intimately dispersed in or intimately admixed with an inert edible carrier or diluent. By an inert edible carrier or diluent is meant one that is nonreactive with respect to the benzoylacrylanilide compound, and that may be administered with safety to the animals to be treated. The carrier or diluent is preferably one that is or may be an ingredient of the animal feed.

The compositions which are a preferred feature of this invention are the so-called feed supplements in which the substituted benzoylacrylanilides of this invention are present in relatively large amounts and which are suitable for addition to the poultry feed either directly or after an intermediate dilution or blending step. Examples of carriers or diluents suitable for such compositions are animal feed ingredients including edible vegetable substances such as distillers' dried grains, corn meal, citrus meal, fermentation residues, wheat shorts, molasses solubles, corn germ meal, corn cob meal, toasted dehulled soya flour, soybean mill feed, antibiotic mycelia, soya grits, and mineral substances such as ground oyster shells, Attapulgus clay, crushed dolomite and limestone. The benzoylacrylanilide compound is intimately dispersed or admixed throughout the solid inert carrier by methods such as grinding, stirring, milling, or tumbling. By selecting proper diluents and by altering the ratio of carrier to active ingredient, compositions of any desired concentration may be prepared. Formulations containing from about 1 percent to about 40 percent by weight and preferably from about 2-25 percent by weight, of the substituted benzoylacrylanilide are suitable as a feed supplement or so-called pre-mix which is intended for addition to poultry feedstuffs. Those having from about 5-20 percent by weight of coccidiostat are especially satisfactory for supplement compositions and are preferred. The active compound is usually dispersed or mixed uniformly in the diluent, but in some instances may be advantageously sorbed on the carrier. Since it is convenient for the feed manufacturer to use about one pound of feed supplement for each ton of finished feed, the preferred concentration in the supplement is usually a function of the lvel of active ingredient desired in the finished feed.

It is common practice to further dilute the feed supplements with materials such as corn meal or soybean meal before being incorporated in the animal feed. In this intermediate processing step the level of the compounds of this invention in the carrier is brought down to about 0.1 percent to 1.0 percent by weight. This dilution serves to facilitate uniform distribution of the coccidiostat in the finished feed. The finished feed is one that contains a source of fat, protein, carbohydrate, minerals, vitamins and other nutritional factors.

Very low levels of benzoylacrylanilide compounds in the ultimate feed are sufficient to afford the poultry good protection against coccidiosis. Suitably the compound is administered to chickens in an amount equal to about 0.0005 percent to 0.10 percent by weight of the daily feed intake. Preferred results are obtained by feeding at a level of about 0.001 percent to 0.05 percent by weight of the finished feed, and most preferably at a level of 0.0125 percent to 0.05 percent by weight. For therapeutic treatment of an established coccidial infection, higher amounts of substituted benzoylacrylanilides, i.e., up to about 0.1 percent by weight of the feed consumed, may be employed. The most advantageous dosage level will, of course, vary somewhat with particular circumstances such as the type and severity of the coccidial infection to be treated and the likelihood of reinfection.

It will likewise be understood by those skilled in this art that spacial feed supplement formulations and finished animal feeds containing vitamins, antibiotics, growth-promoting agents and other nutritional substances may include one or more compounds of this invention. The following is a typical product of this type to which a compound of this invention can be added so as to comprise from 1 percent to 40 percent of the total weight.

| Ingredients | Amount/lb. of Supplement, grains |
|---|---|
| Riboflavin | 0.64 g. |
| DL-calcium pantothenate | 2.10 |
| Niacin | 3.67 |
| Choline Chloride | 50.00 |
| Vitamin $B_{12}$ concentrate | 1.30 mg. |
| Procaine penicillin | 0.84 g. |
| Vitamin A (100,000 u./g.) | 3.38 |
| Vitamin $D_3$ (200,000 u./g) | 0.68 |
| Arsanilic acid | 18.36 |
| Butylated hydroxy toluene | 23.15 |
| DL-methionine | 23.15 |
| Distillers' grains to 1 pound | |

Animal feed supplements having the following compositions are prepared by intimately mixing the benzoylacrylanilide and the particular edible solid diluent or diluents.

| | | Lbs. |
|---|---|---|
| A. | 3-(2,4,6-mesitoyl)-2',6'-dimethylacrylanilide | 7.5 |
| | Distillers' dried grains | 92.5 |
| B. | 3-(2,4-xyloyl)-2',6'-methylacrylanilide | 5.0 |
| | Soybean mill feed | 50.0 |
| | Fine soya grits | 45.0 |
| C. | 3-(3-toluyl)-2',6'-dimethylacrylanilide | 10.0 |
| | Molasses solubles | 90.0 |
| D. | 3-(4-toluyl)-2',6'-dimethylacrylanilide | 15.0 |
| | Corn distillers' dried grains | 55.0 |
| | Corn germ meal | 30.0 |
| E. | 3-(2-toluyl)-2',6'-dimethylacrylanilide | 20.0 |
| | Wheat shorts | 30.0 |
| | Corn distillers' dried grains | 50.0 |
| F. | 3-(4-benzoyl)-2',6'-diethylacrylanilide | 25.0 |
| | Corn distillers' dried grains | 75.0 |
| G. | 3-(benzoyl)-2',6'dimethylacrylanilide | 10.0 |
| | Nicarbazin | 15.0 |
| | Corn distillers' dried grains | 75.0 |

These supplements are made by mechanical milling or mixing of the ingredients to insure uniform distribution of the active compound.

This invention is not limited to coccidiostatic compositions having the benzoylacrylanilides as the sole active ingredient of this invention. Compositions may be prepared containing a compound of this invention admixed with one or more coccidiostats such as sulfaquinoxaline, other sulfa compounds, 4,4'-dinitrocarbanilide-2-hydroxy-4,6-dimethylpyrimidine complex, 3,3'-dinitrodiphenyldisulfide, 5-nitrofurfural semicarbazone, amprolium, zoalene, buquinolate, Coban, ethopabate, and the like. The combination of the substituted acrylanilides of this invention with benzyl substituted 6-amino purines and their N-oxides is however the invention of our colleagues, Brinton Miller and Edward McManus.

In the above discussion of this invention, emphasis has been placed on solid compositions wherein the active ingredient is mixed with an edible carrier in a feed supplement or in the final poultry feedstuff. This is the preferred method of administering the benzoylacrylanilide compound of this invention.

An alternate method of treatment is to dissolve or suspend the benzoylacrylanilide compound in the drinking water of animals. This method can be used to advantage in flocks having an established infection, because infected birds tend to consume less feed. The quantity of coccidiostat which may be administered in this fashion is, of course, limited by the solubility of the product in water or by the quantity that may be suspended in the water without undue settling. The preferred dose levels in the drinking water are usually somewhat less than those employed in a solid feed inasmuch as poultry drink about twice as much as they eat. A suitable level in drinking water is from 0.001 percent to 0.05 percent by weight of the substituted acrylanilide, the preferred range being from 0.001 percent to 0.025 percent by weight. For this purpose, it is convenient to prepare dispersible or water-soluble powders in which the substituted benzoylacrylanilide is intimately dispersed in a suitable water-soluble or dispersible liquid or solid carrier such as dextrose, sucrose, or other suitable non-toxic carriers, at concentrations of from about 0.03 percent to about 25 percent by weight with emulsifiers and surface active agents, if desired. These solids may then be conveniently added to the drinking water by the poultry grower.

A typical drinking water formulation contains 3-(2,4,6-mesitoyl)-2',6'-dimethylacrylanilide, 0.025 percent; dextrose, 30 percent; propylene glycol, 20 percent; dimethylpolysiloxane, 0.002 percent; polyoxyethylene sorbitan monoleate, 0.2 percent; water, to 100 percent.

The compounds of this invention are active anticoccidial agents and are employed in the above anticoccidial compositions are prepared by reacting the appropriately substituted benzoylacrylic acid with the appropriately substituted aniline in the presence of a coupling reagent. Most suitably, the benzoylacrylanilide is prepared by reaction of a solution of the corresponding benzoylacrylic acid and aniline with phosphorous oxychloride/triethylamine complex. The complex is best prepared in situ. The preferred procedure involves treating a tetrahydrofuran solution of one equivalent of the substituted benzoylacrylic acid and one equivalent of the substituted aniline with one equivalent of phosphorous oxychloride followed by the addition of two equivalents of triethylamine.

Of the starting materials used for preparing the compounds of this invention the substituted aniline compounds are known. Benzoylacrylic acid is also known, and the substituted benzoyl acrylic acids can be prepared from the appropriately substituted benzene by condensation with maleic anhydride. This reaction is performed by standard techniques utilized in conducting a Friedel-Crafts condensation employing the usual Friedel-Crafts catalyst such as Lewis acids especially aluminum chloride as outlined in Papa, Journal of the American Chemical Society, 70:3356 (1948), and Cramer, Journal of the American Pharmaceutical Association, 37:439 (1948).

When preparing substituted benzoylacrylic acids where the substituents present on the benzene reactant would tend to hinder its condensation with the maleic anhydride, it is preferable to employ the following preparative method. The substituted benzene is reacted with dichloroacetyl chloride, employing at least an equivalent amount of the dichloroacetyl chloride. The reactants are admixed in the presence of a Lewis acid catalyst, such as, aluminum chloride. After reaction at 50°C. to 90°C. for a period of from 3-10 hours, the substituted acetophenone is isolated. This is in turn reacted with an alkali alkoxide suitably sodium methoxide in a suitable solvent such as methyl alcohol at room temperature. By suitable solvent is meant one which does not react irreversibly with reactants as products. After about 2 hours, the reaction is generally complete and the dialkoxy derivative isolated. Upon treatment with acid, the glyoxal hydrate is obtained and reacted by condensation with malonic acid followed by decarboxylation thereby forming the desired substituted benzoylacrylic acid. When preparing substituted benzoylacrylic acids where the substituents present on the benzene reactant would prevent condensation with maleic anhydride or produce an undesirable isomer of the substituted benzoylacrylic acid, it is preferable to employ the following preparative procedure. The corresponding substituted acetophenone in aqueous acetic acid is oxidized with an equivalent amount of selenium dioxide ($SeO_2$) at 50°C. to 150°C. for ½ to 3 hours. The corresponding substituted phenyl glyoxal hydrate is isolated and converted to the benzoylacrylic acid as described above.

The following examples are set forth to illustrate the preparation of the compounds employed in this invention and are not to be construed as limitations thereon.

EXAMPLE 1

3-(Benzoyl)-2',6'-dimethylacrylanilide

There is dissolved in 25 ml. of tetrahydrofuran 1.8 g. of benzoylacrylic acid followed by the addition of 1.2 g. of 2,6-dimethylaniline. To the reaction mixture is then added 2.2 g. of dicyclohexylcarbodiimide. The resulting clear solution is agitated for 2 hours. A precipitate forms during this period and this precipitate removed by filtration and then washed with tetrahydrofuran. After drying under vacuum there is obtained 0.9 g. of N,N'-dicyclohexylurea.

The filtrate from the above procedure is treated with 2 ml. of glacial acetic acid and then allowed to stand for ½ hour at room temperature to convert any unreacted dicyclohexylcarbodiimide to dicyclohexylurea. The solution is then again filtered and the filtrate stripped under vacuum. The residue is dissolved in 700 ml. benzene and washed with 188 ml. of cold one normal HCl followed by a wash with an equal volume of water and then an equal volume of aqueous 5 percent sodium bicarbonate. The benzene solution is dried over anhydrous magnesium sulfate, filtered and stripped under vacuum. The residue is dissolved in hot benzene and crystallized. There is obtained 0.4 g. of 3-(benzoyl)-2',6'-dimethylacrylanilide having a melting point of 209°C. - 211°C.

In a procedure analagous to that of Example 1, but substituting in place of the 2,6-dimethylaniline an equivalent amount of 2,6-diisopropylaniline or 2,6-diethylaniline, there is obtained 3-(benzoyl)-2',6'-diisopropylacrylanilide, and 3-(benzoyl)-2',6'-diethylacrylanilide.

EXAMPLE 2

3-(2,4,6-Mesitoyl)-2',6'-dimethylacrylanilide

In 25 ml. of tetrahydrofuran there is dissolved 2.2 g. of 3-(2,4,6-mesitoyl)acrylic acid and 1.2 g. of 2,6 dimethylaniline is added to the reaction mixture followed by addition of 2.2 g. of dicyclohexylcarbodiimide. A gradual precipitation occurs and after two hours the reaction mixture is filtered by suction. The solution is treated with 2 ml. of glacial acetic acid for 15 minutes, filtered and the filtrate is stripped under reduced pressure and the residue dissolved in 500 ml. benzene. The solution is then washed with 90 ml. of 1/10 normal HCl followed by 90 ml. of water, and finally 90 ml. of aqueous 5 percent sodium bicarbonate. The benzene solution after filtration is dried under magnesium sulfate, and stripped to dryness. A 0.7 g. aliquot of the residue is dissolved in 10 ml. benzene and crystallized. There is obtained 0.25 g. of 3-(2,4,6-mesitoyl)-2',6'-dimethylacrylanilide having a melting point of 190°C. - 192°C.

In a manner analogous to that of Example 2, but substituting an equivalent amount of
3-(3-toluyl)acrylic acid,
3-(4-toluyl)acrylic acid,
3-(4-isopropylbenzoyl)acrylic acid,
3-(2,4,6-triisopropylbenzoyl)acrylic acid, and
3-(3,5-di-t-butylbenzoyl acrylic acid, respectively for the 3-(2,4,6-mesitoyl)acrylic acid and employing an analogous
quantity of 2,6-dimethylaniline, there is obtained
3-(3-toluyl)-2',6'-dimethylacrylanilide,
3-(4-toluyl)-2',6'-dimethylacrylanilide,
3-(4-isopropylbenzoyl)-2',6'-dimethylacrylanilide,
3-(2,4,6-triisopropylbenzoyl)-2',6'-dimethylacrylanilide,
and
3-(3,5-di-t-butylbenzoyl)-2',6'-dimethylacrylanilide, respectively.

In addition, employing respectively an analogous quantity of
3-(3,4-xyloyl)acrylic acid, and
3-(3,5-xyloyl)acrylic acid,
in place of the 3-(2,4,6-mesitoyl)acrylic acid, and employing an analogous quantity of 2,6-diethylaniline and
2-methyl-6-ethylaniline respectively in place of the 2,6-dimethylaniline, there is obtained
3-(3,4-xyloyl)-2',6'-diethylacrylanilide and
3-(3,5-xyloyl)-2-methyl-6-ethylacrylanilide.

Now having described this invention, it will be understood that any departure from the above description which conforms to the invention is intended to be included within the scope of the claims.

What is claimed is:

1. A composition for the treatment of coccidiosis in poultry comprising an inert carrier and a therapeutically effective amount of a compound of the formula:

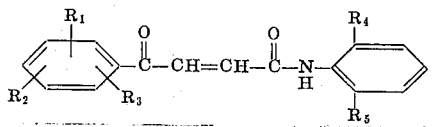

where $R_1$, $R_2$ and $R_3$ are the same or different and are hydrogen or loweralkyl; and where $R_4$ and $R_5$ are the same or different and are loweralkyl.

2. The composition according to claim 1 where said compound comprises from 0.0005 percent to 0.10 percent by weight of said composition.

3. The composition according to claim 1 where said compound comprises from 0.0125 percent to 0.05 percent by weight of said composition.

4. The composition according to claim 1 where said composition is a feed pre-mix and said compound comprises from 1 percent to 40 percent by weight of the premix.

5. The composition according to claim 4 where said compound comprises from 5 percent to 20 percent by weight of said premix.

6. A method for treating coccidiosis in poultry comprising orally administering to poultry a therapeutically effective amount of a compound of the formula:

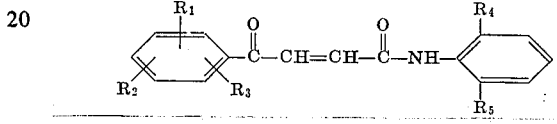

where $R_1$, $R_2$ and $R_3$ are the same or different and are hydrogen or loweralkyl; and $R_4$ and $R_5$ are the same or different and are loweralkyl.

7. The method according to claim 6 where $R_1$, $R_2$ and $R_3$ are hydrogen and $R_4$ and $R_5$ are methyl.

8. The method according to claim 6 where said compound is administered orally as a feed component comprising from 0.0005 percent 0.1 percent by weight of the feed.

9. The method according to claim 6 where said compound is administered orally as a drinking water component comprising from 0.001 percent to 0.05 percent by weight of the drinking water.

* * * * *